United States Patent
Park et al.

(10) Patent No.: US 10,353,433 B2
(45) Date of Patent: Jul. 16, 2019

(54) IMAGE PROCESSING METHOD AND APPARATUS FOR CURVED DISPLAY DEVICE

(71) Applicant: SAMSUNG ELECTRONICS CO., LTD., Suwon-si (KR)

(72) Inventors: Seung-ran Park, Hwaseong-si (KR); Youn-jin Kim, Pocheon-si (KR); Seong-wook Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 14/299,369

(22) Filed: Jun. 9, 2014

(65) Prior Publication Data
US 2015/0002531 A1    Jan. 1, 2015

(30) Foreign Application Priority Data

Jul. 1, 2013  (KR) ......................... 10-2013-0076624

(51) Int. Cl.
| | |
|---|---|
| G09G 5/37 | (2006.01) |
| G06T 5/00 | (2006.01) |
| G06F 1/16 | (2006.01) |
| G09G 5/02 | (2006.01) |
| G09G 3/20 | (2006.01) |

(52) U.S. Cl.
CPC ............ *G06F 1/1652* (2013.01); *G09G 3/20* (2013.01); *G09G 3/2003* (2013.01); *G09G 5/02* (2013.01); *G09G 2320/0285* (2013.01); *G09G 2320/0666* (2013.01); *G09G 2320/0686* (2013.01); *G09G 2340/14* (2013.01); *G09G 2360/16* (2013.01); *G09G 2380/02* (2013.01)

(58) Field of Classification Search
CPC ..................................................... G06F 1/1652
See application file for complete search history.

(56) References Cited

U.S. PATENT DOCUMENTS

| | | | |
|---|---|---|---|
| 7,483,590 B2 * | 1/2009 | Nielsen ................. | G06T 3/0062 382/285 |
| 7,548,357 B2 | 6/2009 | Moriya | |
| 7,639,893 B2 | 12/2009 | Duan et al. | |

(Continued)

FOREIGN PATENT DOCUMENTS

| | | |
|---|---|---|
| CN | 102081894 A | 6/2011 |
| CN | 103176735 A | 6/2013 |

(Continued)

OTHER PUBLICATIONS

English Translation of IDS KR10-2013-0015542, Feb. 2013, p. 1-23.*

(Continued)

*Primary Examiner* — Samantha (Yuehan) Wang
(74) *Attorney, Agent, or Firm* — Sughrue Mion, PLLC

(57) ABSTRACT

An image processing method and apparatus for a curved display device are provided. The image processing method includes acquiring physical curvature information related to the display device, determining a center region of an input image based on the physical curvature information, generating a pixel-by-pixel spatial indexed gain based on the determined center region of the input image, and correcting a pixel value of the input image by using the pixel-by-pixel spatial indexed gain.

20 Claims, 6 Drawing Sheets

(56) References Cited

U.S. PATENT DOCUMENTS

| | | | |
|---|---|---|---|
| 7,822,272 B2 | 10/2010 | Lei | |
| 8,963,833 B2 | 2/2015 | Yu | |
| 2005/0169524 A1 | 8/2005 | Moriya | |
| 2007/0230788 A1 | 10/2007 | Lei | |
| 2008/0166043 A1 | 7/2008 | Bassi et al. | |
| 2008/0174605 A1 | 7/2008 | Kiuchi et al. | |
| 2010/0002402 A1* | 1/2010 | Rogers | H01L 21/4867 361/749 |
| 2011/0018892 A1* | 1/2011 | Otawara | G09G 5/02 345/589 |
| 2011/0037742 A1* | 2/2011 | Suh | G06F 3/1431 345/211 |
| 2011/0102390 A1 | 5/2011 | Moriwaki | |
| 2012/0092363 A1 | 4/2012 | Kim et al. | |
| 2012/0235893 A1 | 9/2012 | Phillips et al. | |
| 2012/0269132 A1 | 10/2012 | Wilson et al. | |
| 2012/0288189 A1 | 11/2012 | Hu et al. | |
| 2013/0162556 A1 | 6/2013 | Yu | |
| 2013/0241921 A1* | 9/2013 | Kurtenbach | G06T 15/20 345/419 |

FOREIGN PATENT DOCUMENTS

| | | | |
|---|---|---|---|
| JP | 201199982 A | 5/2011 | |
| JP | 2012-248911 A | 12/2012 | |
| KR | 1020130015542 A | 2/2013 | |
| KR | 101258327 B1 | 4/2013 | |
| WO | 2013094866 A1 | 6/2013 | |

OTHER PUBLICATIONS

Raskar et al., Quadric Transfer for Immersive Curved Screen Displays, 2004, Eurographics 2004, vol. 23 (2004), No. 3, p. 451-460.*
Communication dated Oct. 10, 2014, issued by the International Searching Authority in counterpart International Application No. PCT/KR2014/005825.
Communication dated Dec. 6, 2016, from the Japanese Patent Office in counterpart application No. 2016-523658.
Communication dated Dec. 19, 2016, from the European Patent Office in counterpart European Application No. 14820691.5.
Communication dated May 16, 2017, issued by the State Intellectual Property Office of the People's Republic of China in counterpart Chinese Patent Application No. Application No. 201480046529.5.
Japanese Patent Office, Office Action in counterpart JP Application No. 2016-523658, dated Aug. 15, 2017.
Communication dated Nov. 28, 2017, issued by the European Patent Office in counterpart European application No. 14 820 691.5.
Communication dated Jan. 31, 2018, issued by the Chinese Patent Office in counterpart Chinese application No. 201480046529.5.
Communication dated Jul. 26, 2018, issued by the European Patent Office in counterpart European Application No. 14820691.5.
Communication (Decision to refuse) dated Mar. 6, 2019, from the European Patent Office in counterpart European Application No. 14820691.5.
Communication (Minutes of Oral Proceedings) dated Mar. 6, 2019, from the European Patent Office in counterpart European Application No. 14820691.5.

* cited by examiner

IMAGE PROCESSING METHOD AND APPARATUS FOR CURVED DISPLAY DEVICE

RELATED APPLICATIONS

This application claims the benefit of Korean Patent Application No. 10-2013-0076624, filed on Jul. 1, 2013, in the Korean Intellectual Property Office, the disclosure of which is incorporated herein by reference, in its entirety.

BACKGROUND

1. Field

One or more exemplary embodiments relate to image processing methods and apparatuses. More particularly, the exemplary embodiments relate to methods and apparatuses for adaptively correcting a pixel component of an image to a pixel-by-pixel position, with reference to the curvature of a display device.

2. Description of the Related Art

Recently, with the development of display technology, flexible display devices, foldable display devices, bendable display devices, curved display devices, and the like, may be implemented in hardware.

However, because an image is processed to be displayed in a flat display device, distortion may occur when the image is displayed in a curved display device having physical curvature. Also, a bend or deformation of the display device may affect peripheral vision characteristics recognized by viewers, i.e., viewing angle, thus degrading recognition of image quality factors such as three-dimensional effect, definition, and the perspective of an object in an image displayed on the display device.

In the related art, methods are used to control a processing strength of a color signal in the same screen, with reference to the spatial frequency, brightness, or saturation of an input image signal, in order to prevent the degradation of image quality factors. However, in related art, methods of controlling signal processing strength, a signal processing strength distribution changes rapidly due to nonlinear characteristics of a general image. This results in causing a contour artifact or a noise artifact. In actual practice, it is difficult to control the image processing strength in order to prevent an artifact, and thus, the result of image quality improvement is not high.

SUMMARY

One or more exemplary embodiments includes an image processing method for a curved display device, which improves the recognition image quality factors of an image, such as three-dimensional effect, definition, and perspective, by correcting a color component, according to a curvature degree of the display device in an image processing apparatus with a physical deformation such as a shape change or a bend of the display device.

Additional aspects will be set forth in part in the description which follows and, in part, will be apparent from the description, or may be learned by practice of the exemplary embodiments.

According to one or more exemplary embodiments, a method of processing an input image for a curved display device includes: acquiring physical curvature information related to the display device; determining a center region of an input image based on the physical curvature information; generating a pixel-by-pixel spatial indexed gain based on the determined center region of the input image; and correcting a pixel value of the input image by using the pixel-by-pixel spatial indexed gain.

The correcting of the pixel value may include changing at least one of brightness, saturation, and hue of a color component of a pixel included in the input image.

The physical curvature information may be detected through a deformation sensor attached to the display device.

The determining of the center region of the input image may include determining a shape and a position of the center region of the input image.

The determining of the center region of the input image may include determining a concave portion of the display device as the center region by using the physical curvature information.

The determining of the center region of the input image may include: detecting at least one object in the input image; and determining the center region by using the physical curvature information and a position of the at least one detected object.

The detecting of the at least one object may include performing face detection or edge detection.

The determining of the center region of the input image may include: detecting a composition in the input image; and determining the center region by using the physical curvature information and the detected composition.

The pixel-by-pixel spatial indexed gain may be a gain value of a color component, which decreases in a direction away from the determined center region.

The color component may include at least one of brightness, saturation and hue.

The image processing method may further include performing color space conversion on the input image to divide the input image into a brightness component, a saturation component, and a hue component, when the input image is a red/green/blue (RGB) image.

According to one or more exemplary embodiments, an image processing apparatus for a curved display device includes: a curvature information acquirer configured to acquire physical curvature information related to the display device; a center region determiner configured to determine a center region of an input image based on the physical curvature information; a gain generator configured to generate a pixel-by-pixel spatial indexed gain based on the determined center region of the input image; and an image corrector configured to correct a pixel value of the input image by using the pixel-by-pixel spatial indexed gain.

The display device may be configured as at least one of a flexible display device, a foldable display device, a bendable display device and a curved display device.

According to one or more exemplary embodiments, a non-transitory computer-readable recording medium is configured to store a program, which, when executed by a processor of a computer, causes the computer to execute the image processing method for a curved display device.

An aspect of an exemplary embodiment may further provide an image processing apparatus for a curved display device, including: a center region determiner configured to determine a center region of an input image based on physical curvature information of the curved display device; a gain generator configured to generate a pixel-by-pixel spatial indexed gain based on the determined center region of the input image; and an image corrector configured to correct a pixel value of the input image by using the pixel-by-pixel spatial indexed gain.

The image processing apparatus for a curved display device may further include a curvature information acquirer configured to acquire physical curvature information related to the display device.

The image processing apparatus for a curved display device may further include a deformation sensor configured to sense the physical curvature information related to the display device.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
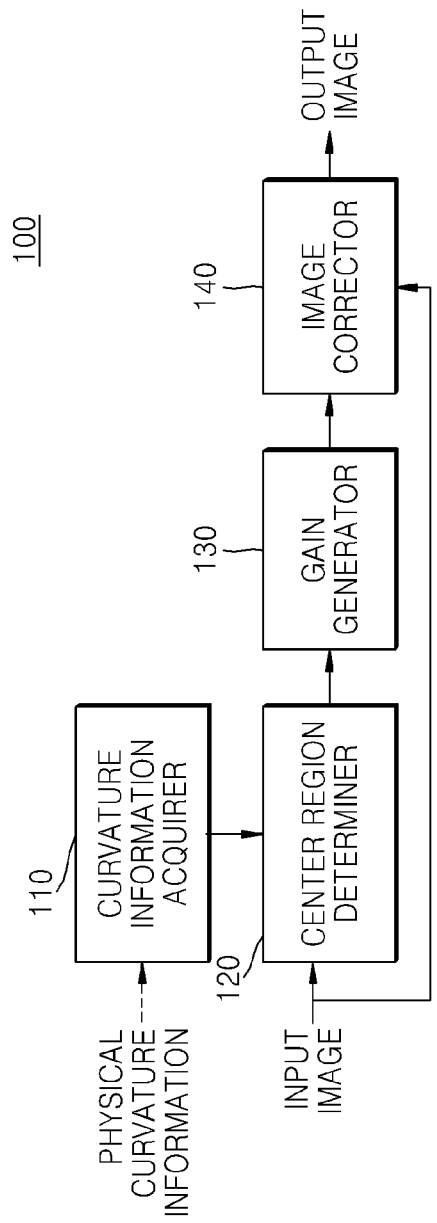
FIG. 1A is a block diagram of an image processing apparatus 100 for a curved display device, according to an exemplary embodiment.

Reference will now be made in detail to the exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to provide a comprehensive understanding of the disclosure. As used herein, expressions such as "at least one of," when preceding a list of elements, modify the entire list of elements and do not modify the individual elements of the list.

Hereinafter, image processing methods and apparatuses for a curved display device, according to exemplary embodiments will be described in detail with reference to the accompanying drawings. The invention may, however, be embodied in many different forms and should not be construed as being limited to the exemplary embodiments set forth herein. In the following description, detailed descriptions of well-known functions or configurations will be omitted since they would unnecessarily obscure the subject matter of the application. Also, like reference numerals in the drawings denote like elements, and thus their descriptions will be omitted.

FIG. 1A is a block diagram of an image processing apparatus 100 for a curved display device, according to an exemplary embodiment.

Referring to FIG. 1, the image processing apparatus 100 includes a curvature information acquirer 110, a center region determiner 120, a gain generator 130, and an image corrector 140. The image processing apparatus 100 may acquire physical curvature information related to the display device, determine a center region of an input image based on the physical curvature information, and correct a pixel value of the input image according to a pixel-by-pixel position, based on the determined center region.

The curvature information acquirer 110 of the image processing apparatus 100 may acquire curvature information of the display device. In the case of a display device with a fixed curvature, the curvature information acquirer 110 may receive physical curvature information related to the display device with reference to the profile of the display device. When a separate sensor attached to the display device senses a deformation of the display device, the curvature information acquirer 110 may receive curvature information from the sensor.

According to an exemplary embodiment, the display device having a physical deformation may be a flexible display device, a foldable display device, a bendable display device or a curved display device. However, an exemplary embodiment is not limited thereto, and various physically-deformable display devices may be used.

The center region determiner 120 of the image processing apparatus 100 may determine a center region of an input image based on the curvature information acquired by the curvature information acquirer 110. In particular, the center region determiner 120 may determine a position of the center region of the input image and a shape of the center region with reference to the physical curvature information of the display device, and the position of the center region and the shape of the center region may vary according to the shape of curvature of the display device. For example, a position of an apex of the curvature may be determined as the position of the center region, and the shape of the center region may be determined differently according to the curvature, wherein the shape may be circular, elliptical, tetragonal or polygonal.

According to an exemplary embodiment, the center region determiner 120 may determine a concave portion of the display device to be the center region. When the display device is curved in the shape of a wave, the center region determiner 120 may determine at least one concave portion as being the center region. According to another exemplary embodiment, the shape and position of the center region may be adaptively determined according to a composition or an object detected in the input image, which will be described later, in detail.

The gain generator 130 of the image processing apparatus 100 may generate a pixel-by-pixel spatial indexed gain based on the center region of the input image as determined by the center region determiner 120. The pixel-by-pixel spatial indexed gain is a gain value of a color component, which is determined differently according to the position of a pixel included in the input image, and the color component may include at least one of brightness, saturation and hue.

For example, when the gain generator 130 generates a pixel-by-pixel spatial indexed gain of a color component, a three-dimensional effect of a screen with respect to a viewing angle may be increased by increasing the image processing strength in a concave portion of the screen, and the three-dimensional effect of the screen with respect to a viewing angle may be reduced by reducing the image processing strength in a convex portion of the screen, thereby making it possible to maintain the three-dimensional effect. That is, the gain generator 130 may generate a gain that has a high value in the concave portion and has a low value in the convex portion. When the concave portion is the center portion, a high gain is allocated to the center region and a low gain is allocated to a portion that is remote from the center region, thereby achieving the above effect.

The image corrector 140 of the image processing apparatus 100 may correct a pixel value of the input image by using the pixel-by-pixel spatial indexed gain.

In particular, by using the pixel-by-pixel spatial indexed gain, the image corrector 140 is able to differentially correct pixel-by-pixel color components, based on Equation 1, below.

$$\text{Out} = \text{In}[i][j] \times \text{Gain} + \text{Offset} \qquad [\text{Equation 1}]$$

In Equation 1, In[i][j] denotes a pixel value of an [i][j]-th input image, Gain denotes the pixel-by-pixel spatial indexed gain, and Out denotes an output image. Also, Offset denotes an offset applied to all characteristics of the input image. For example, an offset may be set to normalize a pixel value of the output image.

As seen from Equation 1, as a result of correcting the input image by applying the pixel-by-pixel spatial indexed gain to the color component, an image may be output in which the recognition image quality, such as three-dimensional effect, definition, and perspective is not degraded in a display device with curvature.

The color component of a pixel to be corrected may include at least one of brightness, saturation and hue. When the input image is a red/green/blue (RGB) image, the image processing apparatus 100 may perform color space conversion on the RGB image, divide the input image into a brightness component, a saturation component and a hue component, and variously perform the above operations on the respective components.

An example of the color space conversion on the RGB image is YCbCr conversion. However, an exemplary embodiment is not limited thereto, and various color space conversion methods may be used. Since those of ordinary skill in the art will readily understand a method of dividing an RGB image into a brightness component, a saturation component and a hue component, a detailed description thereof is omitted herein.

In Equation 1, in the correcting of a pixel value according to an exemplary embodiment, an offset may be further included. The offset is a value that is set in consideration of the average brightness of the entire input image. When the input image is corrected only by the pixel-by-pixel spatial indexed gain, without consideration of the color component of the input image, an unnatural image may be displayed due to the nonlinear characteristics of the input image. Thus, by using the pixel-by-pixel spatial indexed gain generated with reference to the physical curvature and by considering the average brightness of the input image in correcting the pixel value, the output image may be prevented from having an unnatural color component.

Detailed operations of the curvature information acquirer 110, the center region determiner 120, the gain generator 130, and the image corrector 140, according to an exemplary embodiment, will be described below with reference to FIG. 1B.

Figure 1B:
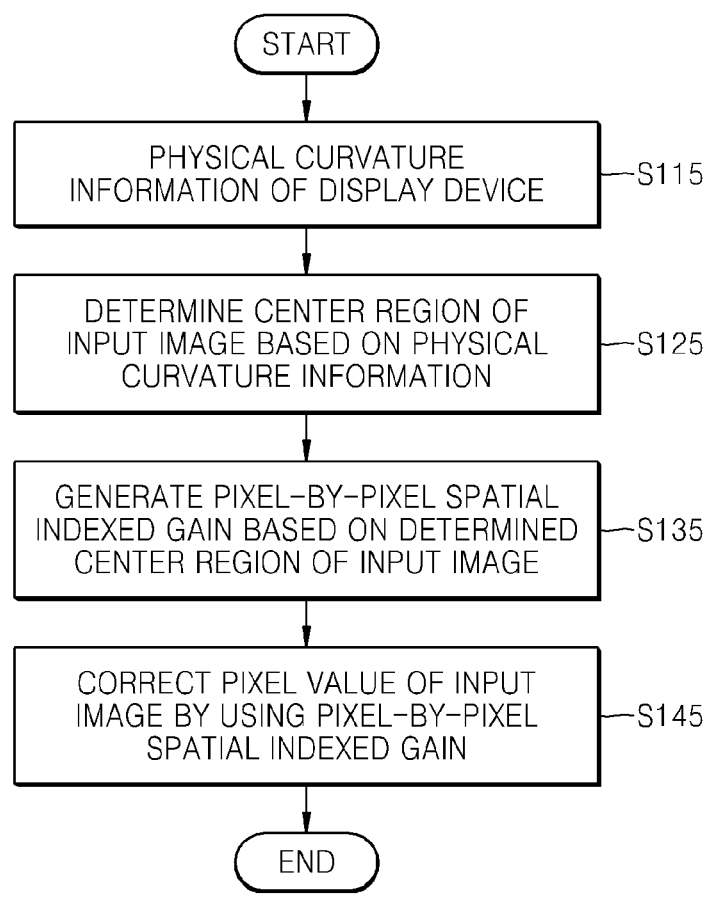
FIG. 1B is a flowchart which illustrates an image processing method for a curved display device, according to an exemplary embodiment.

Referring to FIG. 1B, a method of processing an image for a curved display device includes operations that are sequentially processed in the image processing apparatus 100, which is illustrated in FIG. 1A. Therefore, even when there are contents which are omitted in the following description, the contents described above in relation to the image processing apparatus 100 illustrated in FIG. 1A may also be applied to the method illustrated in FIG. 1B.

In operation S115, the curvature information acquirer 110 may acquire curvature information related to the display device. According to an exemplary embodiment, when the image processing apparatus 100 includes a display device having a fixed physical curvature, the curvature information acquirer 110 may acquire from the profile of the display device physical curvature information related to the display device. According to another exemplary embodiment, when the display device has a variable physical curvature, the curvature information acquirer 110 may acquire physical curvature information related to the display device through a sensor attached to the display device.

In operation S125, the center region determiner 120 may determine a center region of an input image based on the physical curvature information acquired by the curvature information acquirer 110. In particular, the center region determiner 120 may determine a shape and a position of the center region based on the physical curvature information related to the display device.

Figure 2:
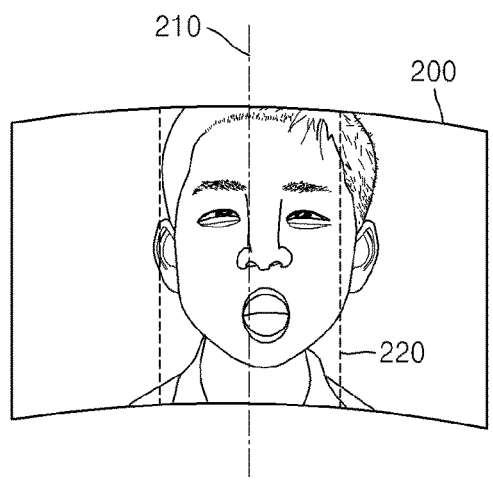
FIG. 2 illustrates an example of determining a center region 220 of a display device 200, according to an exemplary embodiment.

FIG. 2 illustrates an example of determining a center region 220 of a display device 200, according to an exemplary embodiment.

Referring to FIG. 2, in the case of a display device 200 that has two concave regions which are symmetrical to each other with respect to a center region, the center region determiner 120 may determine the center of the display device 200 as the position of the center region based on the curvature information acquired from the display device. Since a screen is curved with a predetermined curvature, the shape of the center region may be determined as a tetragon 220.

Referring to FIG. 2, in the case of a display device 200 that has two concave regions which are symmetrical to each other with respect to a center region, the center region determiner 120 may determine the center line 210 of the display device 200 as the position of the center region based on the curvature information acquired from the display device. Since a screen is curved with a predetermined curvature, the shape of the center region may be determined as a tetragon 220.

Referring back to FIG. 1B, in operation S135, the gain generator 130 may generate a pixel-by-pixel spatial indexed gain based on the center region of the input image determined by the center region determiner 120. In particular, the gain generator 130 may generate a pixel-by-pixel spatial indexed gain having a value based on the position and shape of the center region determined with reference to the physical curvature.

Figure 3:
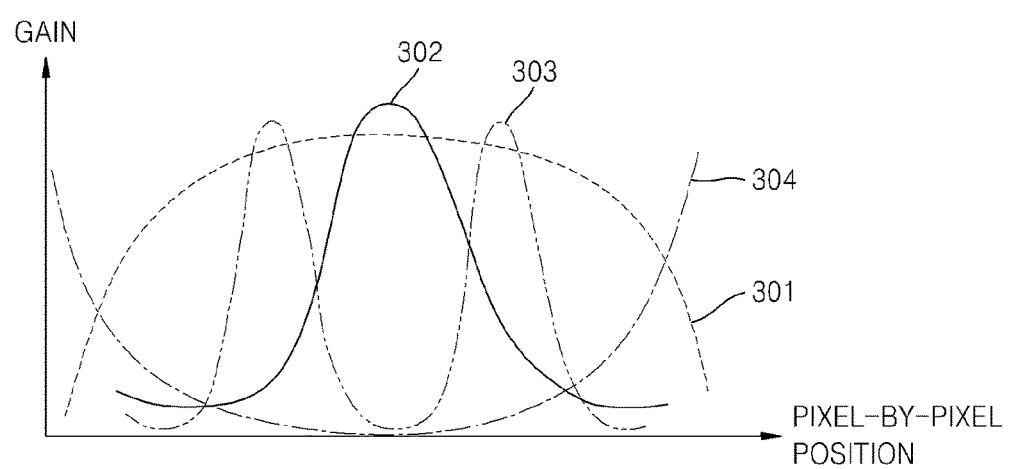
FIG. 3 is a graph which illustrates a pixel-by-pixel spatial indexed gain according to an exemplary embodiment.

FIG. 3 is a graph which illustrates a pixel-by-pixel spatial indexed gain according to an exemplary embodiment. In the graph illustrated in FIG. 3, a horizontal axis represents a pixel position in a predetermined line of an input image, and a vertical axis represents a gain of a pixel-by-pixel color component of a predetermined line.

Referring to FIG. 3, in the case of a display device having a screen with a concaved center according to an exemplary embodiment, the gain of the pixel-by-pixel color component may be distributed such that the gain increases toward the center as represented in graphs 301 and 302. The graphs 301 and 302 indicate that a slope of the display device differs according to the physical curvature of the display device. When the slope of the display device is gentle, the gain increases or decreases at a gentle slope, as illustrated by the graph 301, and when the slope of the display device is steep, the gain increases or decreases at a steep slope, as illustrated by the graph 302.

When the display device has two curves and is in the shape of a wave, since two center regions are respectively set on the two curves, the gain may be distributed as illustrated by a graph 303, according to another exemplary embodiment. When the display device is curved convexly, the gain may be distributed as illustrated by a graph 304, according to another exemplary embodiment.

For example, referring to the center region determined in the exemplary embodiment illustrated in FIG. 2, since the center of the display device is concave and has a curvature which corresponds to the size of the center region illustrated in FIG. 2, it may be predicted that a gain will be generated, which has a slope between the graphs 301 and 302 and is distributed such that the image processing strength of the center of the display device is high.

The graphs illustrated in FIG. 3 represent a gain distribution according to a pixel-by-pixel position along one line in an input image. When the shape of the center region is tetragonal, all line distributions may be identical to each other. However, when the shape of the center region is circular or elliptical such that a horizontal distance is non-uniform in the vertical direction, a pixel-by-pixel spatial indexed gain distribution may have different shapes in respective lines in the input image.

In this exemplary embodiment, the pixel-by-pixel spatial indexed gain is illustrated as having a change in the horizontal direction (line by line); however, an exemplary embodiment is not limited thereto and the pixel-by-pixel spatial indexed gain may have changes in various directions according to the physical curvature of the display device.

Referring back to FIG. 1B, in operation S145, the image corrector 140 corrects a pixel value of the input image by using the pixel-by-pixel spatial indexed gain.

For example, according to an exemplary embodiment, when the pixel-by-pixel spatial indexed gain includes a gain for controlling the brightness of the color component and the distribution thereof, has the shape of the graph 301 illustrated in FIG. 3, the input image may be corrected such that the pixels of the center region have high brightness and the pixels remote from the center region have low brightness, thus increasing the three-dimensional effect, definition and perspective of an image displayed in the center region.

According to another exemplary embodiment, when the pixel-by-pixel spatial indexed gain includes a gain of the brightness of the color component and a gain of the saturation thereof, the gain may be generated such that the pixels of the center region have high brightness and low saturation, and the pixels remote from the center region have low brightness and high saturation. By correcting the pixel of the input image in this manner, the three-dimensional effect, definition and perspective of a displayed image may be increased.

According to another exemplary embodiment, in a display device having a wider viewing angle than a flat display device, due to a curvature similar to a concaved display device with both sides curved, a method of processing an image for a curved display device is provided, and thus, an image is output whose recognition image quality, such as a three-dimensional effect, definition and perspective, is not degraded in the display device.

Figure 4A:
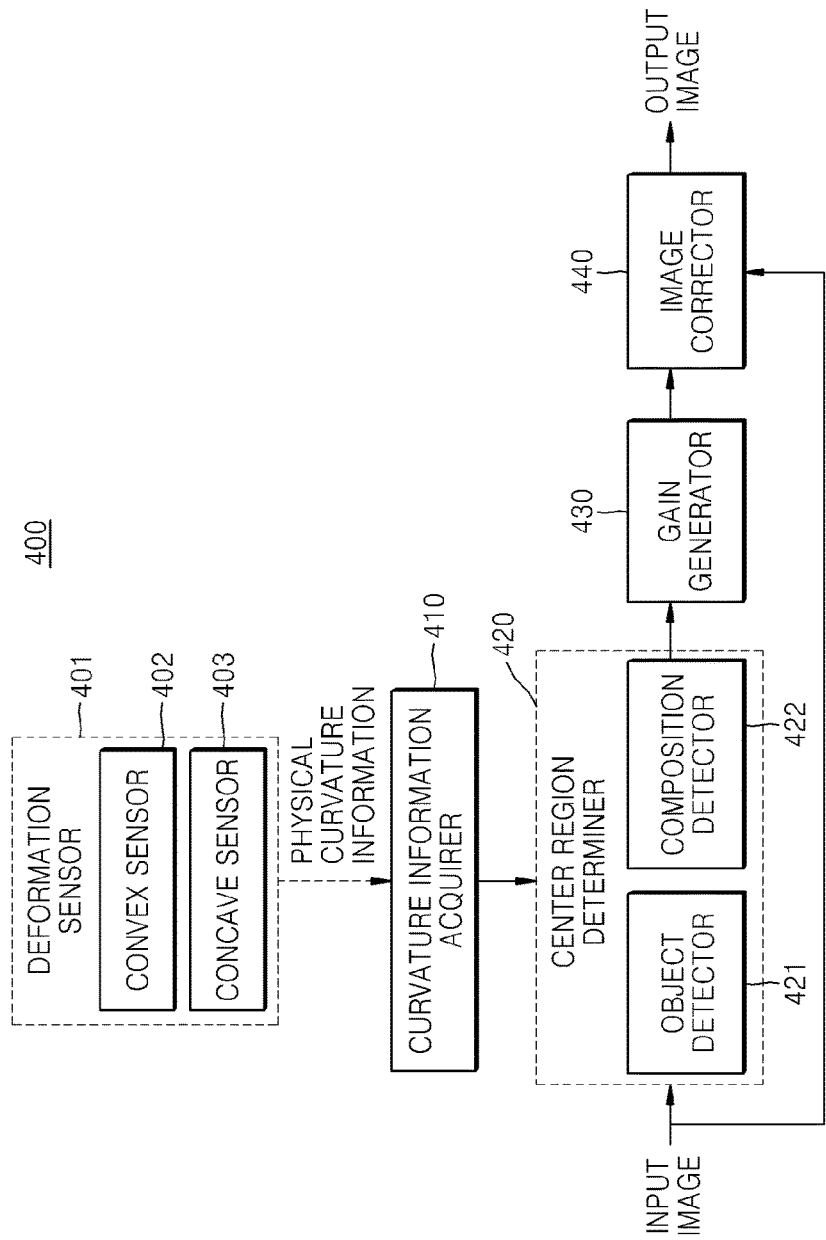
FIG. 4A is a block diagram of an image processing apparatus 400 for a curved display device, according to another exemplary embodiment.
Figure 4B:
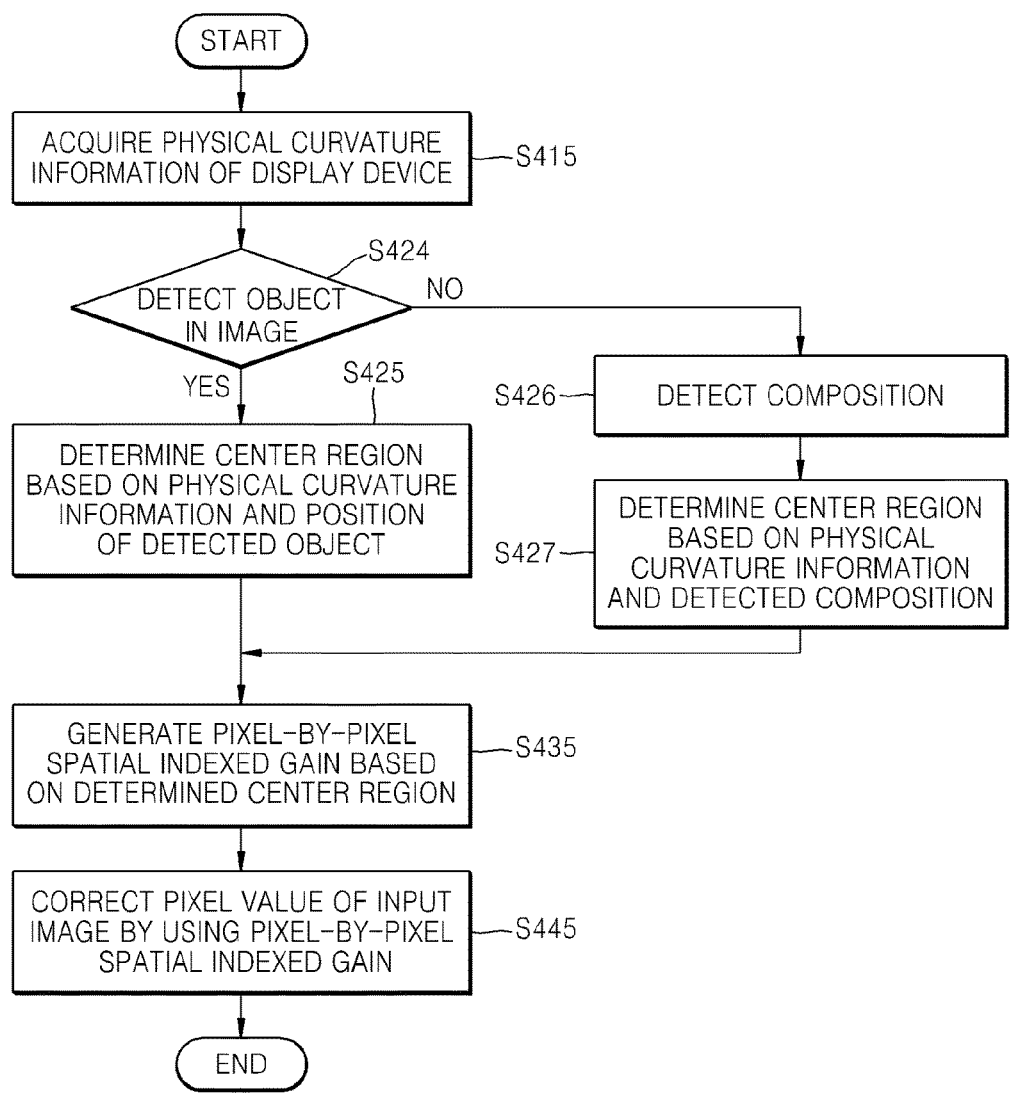
FIG. 4B is a flowchart which illustrates an image processing method for a curved display device, according to another exemplary embodiment.

FIG. 4A is a block diagram of an image processing apparatus 400 for a curved display device, according to another exemplary embodiment, and FIG. 4B is a flowchart which illustrates an image processing method for a curved display device, according to another exemplary embodiment. Since FIGS. 4A and 4B are similar to FIGS. 1A and 1B, a difference there between will be described as follows.

Referring to FIG. 4A, the image processing apparatus 400 includes a deformation sensor 401, a curvature information acquirer 410, a center region determiner 420, a gain generator 430, and an image corrector 440. The deformation sensor 401 includes a convex sensor 402 and a concave sensor 403. The center region determiner 420 includes an object detector 421 and a composition detector 422.

The image processing apparatus 400 may acquire physical curvature information related to the display device through the deformation sensor 401. The image processing apparatus 400 may determine a center region of an input image based on the acquired physical curvature information and an object or a composition detected in the input image. The image processing apparatus 400 may correct a pixel value of the input image, according to a pixel-by-pixel position based on the determined center region.

The deformation sensor 401 of the image processing apparatus 400 may detect curvature information by sensing the deformation of the display device. In particular, when the deformation sensor 401 senses the deformation of the display device, the convex sensor 402 senses the curvature of a convex portion and the concave sensor 403 senses the curvature of a concave portion, thereby detecting curvature information.

The curvature information acquirer 410 may acquire curvature information related to the display device and provide the curvature information to the center region determiner 420.

The center region determiner 420 of the image processing apparatus 400 may determine a center region of the input image based on the curvature information acquired by the curvature information acquirer 410. However, unlike the exemplary embodiment described with reference to FIGS. 1A and 1B, according to another exemplary embodiment, the center region may be determined by using not only the detected physical curvature information but also information detected from the input image.

The object detector 421 of the image processing apparatus 400 may detect at least one object in the input image, and the center region determiner 420 may determine the center region of the input image based on the detected object and the acquired physical curvature information. That is, with respect to the center region determined based on the physical curvature information, the position and shape of the center region may be changed according to the object detected in the input image.

Since a method of determining the center region based on the physical curvature information according to an exemplary embodiment has been described above with reference to FIGS. 1A and 1B, a description thereof is omitted herein.

When an image is input, the object detector 421 of the image processing apparatus 400 may detect an object in the input image. Herein, the object in the input image may correspond to a human face or a characteristic feature of a human face, but is not limited thereto.

In particular, in order to detect the object in the input image, the object detector 421 of the image processing apparatus 400 may extract composition information by applying a face recognition algorithm to the input image.

For example, the object detector 421 may detect the size, position and direction of a face in a displayed image.

In order to detect the size of a face, a facial region may be detected based on a color or an edge thereof.

In order to detect the position of a face, the position of a face may be calculated by using a distance between a center portion of an extracted face region and a center portion of the display device. In order to detect the direction of a face, the direction of a face may be detected from an extracted face region in the shape of a triangle formed by both eyes and a mouth.

Figure 5:
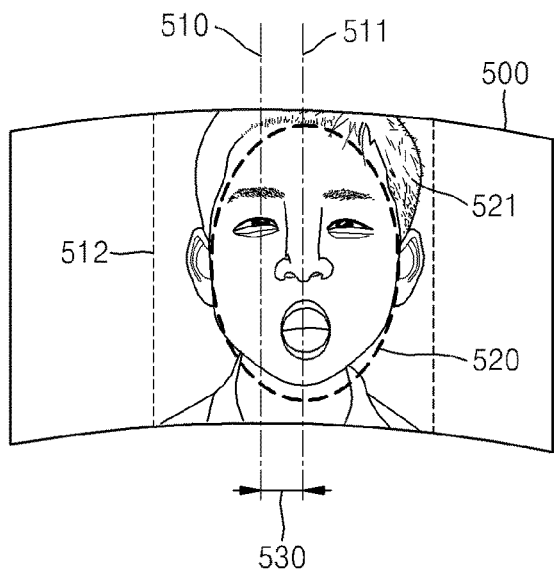
FIG. 5 illustrates an example of determining a center region with reference to an object which is detected based on the physical curvature information of a display device, according to another exemplary embodiment.

For example, as illustrated in FIG. 5, a human face detected in an input image may be detected as an object 521. The above face recognition algorithm is well known in the art, and thus a detailed description thereof is omitted herein.

Figure 6:
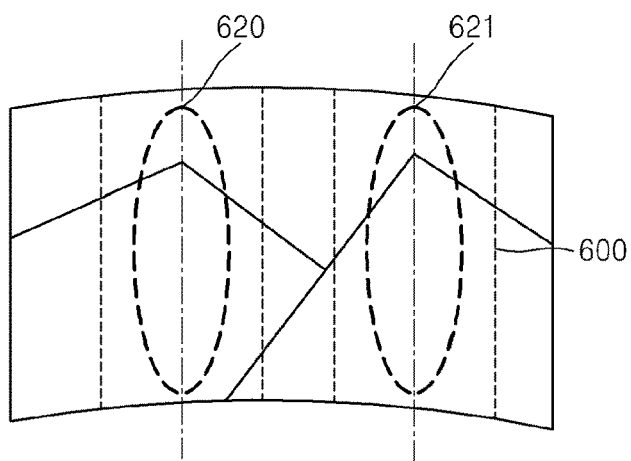
FIG. 6 illustrates another example of determining a center region with reference to an object detected based on the physical curvature information of a display device, according to another exemplary embodiment.

The object detector 421 of the image processing apparatus 400 may detect by edge detection, a characteristic feature of a portion of a human face in the input image as an object. For example, as illustrated in FIG. 6, mountain peaks present on a screen may be detected as objects 620 and 621. The edge detection is well known in the art, and thus a detailed description thereof is omitted herein.

According to an exemplary embodiment, when the object detector 421 detects an object, the center region determiner 420 determines a center region with reference to the detected object, based on the physical curvature information related to the display device.

FIG. 5 illustrates an example of determining a center region with reference to an object detected based on physical curvature information of a display device, according to another exemplary embodiment.

Referring to FIG. 5, according to an exemplary embodiment, in an image input to a display device having a display 500 with a concave center 510, when an object 521 is detected at a position 512 spaced apart from the center 510 by a predetermined distance 530, the position of a center region is not the center 510 but a center 511 of the object 521, and the shape of the center region may be determined to be elliptical, according to the shape of the object 521. That is, when the display devices illustrated in FIGS. 2 and 5 have the same curvature and the center region of the display device illustrated in FIG. 2 is determined based on only physical curvature, the center region is determined as the center region 220 of FIG. 2. In addition, when the center region of the display device illustrated in FIG. 5 is determined based on an object detected in an input image, a center region 520 may be determined based on the detected object, as illustrated in FIG. 5. Thus, by correcting the position and shape of the center region according to the detected object, it is possible to display an image that is corrected, such that three-dimensional effect, definition and perspective thereof are adaptively increased, according to the input image.

On the other hand, when the detected object deviates by a predetermined distance from the position of the center region determined with reference to only the curvature of the display device, the position of the detected object may be determined as another center region according to an exemplary embodiment, and a center region which excludes the object may further be determined according another exemplary embodiment. Herein, the predetermined distance is not limited to a specific value, and may experimentally be freely determined within the range in which the image is determined as being not unnatural.

According to another exemplary embodiment, when a plurality of objects are detected in the input image, regions in which the plurality of objects are detected may be determined as center regions.

FIG. 6 illustrates another example of determining a center region with reference to an object which is detected based on physical curvature information of a display device, according to another exemplary embodiment.

Referring to FIG. 6, two objects detected in an input image 600 are determined as respective center regions 620 and 621.

Referring back to FIG. 4A, the composition detector 422 of the image processing apparatus 400 may detect at least one object in the input image, and the center region determiner 420 may determine the center region based on the detected composition and the acquired physical curvature information. That is, with respect to the center region determined based on the physical curvature information, the position and shape of the center region may be changed according to the composition detected in the input image.

According to an exemplary embodiment, when the object detector 421 fails to detect an object in the input image, the composition detector 422 may perform composition detection. However, an exemplary embodiment is not limited thereto, and object detection and composition detection may be simultaneously performed according to another exemplary embodiment.

In particular, the composition detector 422 may detect a variation rate of a line-by-line tone in the input image, and detect an area of the composition according to the degree of the variation rate. That is, according to an exemplary embodiment, an area in the input image is detected separately from the physical curvature information, and in response to the detected area having a high tone variation rate, the detected area may be determined as a portion to be emphasized, and may be determined as a center region. For example, a portion having a high tone variation rate in the input image is determined as a center region and pixel-by-pixel correction is performed thereon, thereby emphasizing the three-dimensional effect, definition and perspective thereof.

When the center region determiner 420 determines the center region of the input image, the gain generator 430 may generate a pixel-by-pixel spatial indexed gain based on the determined center region of the input image, and the image corrector 440 may correct a pixel value of the input image by using the pixel-by-pixel spatial indexed gain.

Since the gain generator 430 and the image corrector 440 illustrated in FIG. 4A respectively correspond to the gain generator 130 and the image corrector 140 illustrated in FIG. 1A, a detailed description thereof is omitted herein.

Detailed operations of the curvature information acquirer 410, the center region determiner 420, the gain generator 430, and the image corrector 440, according to another exemplary embodiment, will be described below with reference to FIG. 4B.

Referring to FIG. 4B, an image processing method for a curved display device includes operations that are sequentially processed in the image processing apparatus 400 illustrated in FIG. 4A. Therefore, even when contents are omitted in the following description, the contents described above in relation to the image processing apparatus 400 illustrated in FIG. 4A may also be applied to the method illustrated in FIG. 4B.

In operation S415, the curvature information acquirer 410 may acquire curvature information related to the display device. According to an exemplary embodiment, when the display device has a variable physical curvature, curvature information of the display device may be detected by sensing the degree of convex or concave curvature of the display device by using the deformation sensor 401. The curvature information acquirer 110 may acquire the detected curvature information of the display device.

In operation S424, an object is detected in an input image according to an exemplary embodiment. For example, according to an exemplary embodiment, an object may be detected in the input image by performing face detection. According to another exemplary embodiment, an object may be detected in the input image by performing edge detection.

When an object is detected in the input image, the center region determiner 420 determines a center region of the input image based on the position of the detected object and the physical curvature information related to the display device acquired by the curvature information acquirer 410, in operation S425. Herein, the center region determiner 420 may determine a shape and a position of the center region of the input image.

For example, according to an exemplary embodiment, when an object is detected within a predetermined range from the center region determined based on only the physical curvature information, another center region may be determined based on the position and shape of the detected object. According to another exemplary embodiment, the position of the detected object may be set as another center region.

When an object is not detected in the input image in operation S424, a composition may be detected in the input image in operation S426, according to another exemplary embodiment.

In operation S427, the center region determiner 420 of the image processing apparatus 400 may determine a center region of the input image based on the detected composition and the physical curvature information related to the display device.

In particular, the composition detector 422 may detect a variation rate of a line-by-line tone in the input image, and detect an area of the composition, according to the degree of the variation rate. That is, according to an exemplary embodiment, an area in the input image is detected separately from the physical curvature information, wherein an area having a high tone variation rate may be determined as a portion to be emphasized, and may be set as a center region.

According to another exemplary embodiment, when a center region determined only by the composition detection is not spaced apart by a predetermined distance or spaced apart by more than a predetermined distance from a center region determined based on only the physical curvature information, the center region determined only by the composition detection may be determined as a center region of the input image, or both of the center regions may be determined as center regions of the input image.

In operation S435, the gain generator 430 may generate a pixel-by-pixel spatial indexed gain based on the determined center region or regions of the input image.

In operation S445, the image corrector 440 may correct a pixel value of the input image by using the generated pixel-by-pixel spatial indexed gain.

Since operations S435 and S445 illustrated in FIG. 4B correspond to operations S135 and S145 illustrated in FIG. 1B, a detailed description thereof is omitted herein.

In addition, other exemplary embodiments may also be implemented through computer-readable code/instructions in/on a medium, e.g., a computer-readable storage medium, to control at least one processing element in order to implement any above described embodiment. The medium may correspond to any medium/media which permits the storage and/or transmission of the computer readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bit-stream according to one or more exemplary embodiments. The media may also be accessible via a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of processing an image for a curved display device, the method comprising:
    acquiring physical curvature information related to the display device;
    determining a center region of an input image based on the physical curvature information including information about a convex portion of the display device or information about a concave portion of the display device;
    generating a pixel-by-pixel spatial indexed color gain based on the determined center region of the input image; and
    correcting a pixel value of the input image by using the pixel-by-pixel spatial indexed color gain,
    wherein the center region of the input image is determined based on a location of at least one concave or convex portion of the curved display device determined from the physical curvature information, and the center region of the input image is a location from which the pixel value is corrected, and the pixel-by-pixel spatial indexed color gain decreases away from the center region of the image when the center region is the concave portion of the display device, and the pixel-by-pixel spatial indexed color gain increases away from the center region of the image when the center region is the convex portion of the display device.

2. The image processing method of claim 1, wherein the correcting of the pixel value comprises changing at least one of brightness, saturation and hue of a color component of a pixel included in the input image.

3. The image processing method of claim 1, wherein the physical curvature information is detected through a deformation sensor attached to the display device.

4. The image processing method of claim 1, wherein the determining of the center region of the input image comprises using the physical curvature information to determine a concave portion of the display device as the center region.

5. The image processing method of claim 1, further comprising detecting at least one object in an input image; wherein the detecting of the at least one object comprises performing face detection or edge detection.

6. The image processing method of claim 1, wherein the determining of the center region of the input image comprises:
detecting a composition in the input image; and
determining the center region of the input image by using the physical curvature information and the detected composition.

7. The image processing method of claim 1, wherein the pixel-by-pixel spatial indexed color gain is a pixel-by-pixel spatial indexed gain of at least one color component, and the at least one color component comprises at least one of a brightness component, a saturation component, and a hue component.

8. The image processing method of claim 1, further comprising, performing color space conversion on the input image to divide the input image into a brightness component, a saturation component, and a hue component in response to the input image being a red/green/blue (RGB) image.

9. A non-transitory computer-readable recording medium that stores a program therein, wherein the program, when executed by a processor of a computer, causes the computer to perform the method of claim 1.

10. The image processing method of claim 1, wherein the curved display has a plurality of curves, wherein the determining the center region comprises determining a plurality of sub-center regions based on the physical curvature information, and wherein a number of the curves is identical to a number of the sub-center regions.

11. The image processing method of claim 1, wherein the physical curvature information represents a degree to which a planar surface of the curved display is curved.

12. An image processing apparatus for a curved display device, comprising:
a curvature information acquirer configured to acquire physical curvature information related to the display device;
a center region determiner configured to determine a center region of an input image based on the physical curvature information including information about a convex portion of the display device or information about a concave portion of the display device;
a gain generator configured to generate a pixel-by-pixel spatial indexed color gain based on the determined center region of the input image; and
an image corrector configured to correct a pixel value of the input image by using the pixel-by-pixel spatial indexed color gain,
wherein the center region determiner determines the center region of the input image based on a location of at least one concave or convex portion of the curved display device determined from the physical curvature information, and the center region of the input image is a location from which the pixel value is corrected, and the pixel-by-pixel spatial indexed color gain decreases away from the center region of the image when the center region is the concave portion of the display device, and the pixel-by-pixel spatial indexed color gain increases away from the center region of the image when the center region is the convex portion of the display device.

13. The image processing apparatus of claim 12, wherein the image corrector is configured to correct at least one of brightness, saturation and hue of a color component of a pixel included in the input image.

14. The image processing apparatus of claim 12, further comprising a deformation sensor configured to detect the physical curvature information related to the display device, wherein the curvature information acquirer is configured to acquire the detected physical curvature information.

15. The image processing apparatus of claim 12, wherein the center region determiner is configured to determine a concave portion of the display device as the center region by using the physical curvature information.

16. The image processing apparatus of claim 12, wherein the center region determiner comprises a composition detector configured to detect a composition in the input image, and the center region determiner determines the center region by using the physical curvature information and the composition detected by the composition detector.

17. The image processing apparatus of claim 12, wherein the display device is at least one of a flexible display device, a foldable display device, a bendable display device and a curved display device.

18. An image processing apparatus for a curved display device, comprising:
a center region determiner configured to determine a center region of an input image based on physical curvature information of the curved display device;
a gain generator configured to generate a pixel-by-pixel spatial indexed color component gain based on the determined center region of the input image including information about a convex portion of the display device or information about a concave portion of the display device; and
an image corrector configured to correct a pixel value of the input image by using the pixel-by-pixel spatial indexed color component gain,
wherein the center region determiner determines the center region of the input image based on a location of at least one concave or convex portion of the curved display device determined from the physical curvature information, and the center region of the input image is a location from which the pixel value is corrected, and the pixel-by-pixel spatial indexed color gain decreases away from the center region of the image when the center region is the concave portion of the display device, and the pixel-by-pixel spatial indexed color gain increases away from the center region of the image when the center region is the convex portion of the display device.

19. The image processing apparatus for a curved display device of claim 18, further comprising a curvature information acquirer configured to acquire physical curvature information related to the display device.

20. The image processing apparatus for a curved display device of claim 18, further comprising a deformation sensor configured to sense the physical curvature information related to the display device.

* * * * *